(12) United States Patent
Xu et al.

(10) Patent No.: US 9,608,516 B2
(45) Date of Patent: Mar. 28, 2017

(54) BATTERY DISCHARGE CIRCUIT AND DISCHARGE METHOD WITH OVER DISCHARGE PROTECTION

(71) Applicant: Chengdu Monolithic Power Systems Co., Ltd., Chengdu (CN)

(72) Inventors: Min Xu, Hangzhou (CN); Qiming Zhao, Hangzhou (CN)

(73) Assignee: CHENGDU MONOLITHIC POWER SYSTEMS CO., LTD., Chengdu (CN)

( * ) Notice: Subject to any disclaimer, the term of this patent is extended or adjusted under 35 U.S.C. 154(b) by 0 days.

(21) Appl. No.: 14/509,881

(22) Filed: Oct. 8, 2014

(65) Prior Publication Data

US 2015/0102787 A1     Apr. 16, 2015

(30) Foreign Application Priority Data

Oct. 11, 2013 (CN) .......................... 2013 1 0472688

(51) Int. Cl.
*G05F 5/00* (2006.01)
*H02M 3/04* (2006.01)
*H02J 7/00* (2006.01)

(52) U.S. Cl.
CPC ............. *H02M 3/04* (2013.01); *H02J 7/0065* (2013.01)

(58) Field of Classification Search
CPC .... H02M 3/156; H02M 3/1588; H02M 3/157; Y02E 60/12; H02J 7/0093; H02J 7/0031
USPC .......................... 323/222, 271, 282–285, 299; 320/127–129, 134, 135, 136
See application file for complete search history.

(56) References Cited

U.S. PATENT DOCUMENTS

| 6,593,725 | B1 * | 7/2003 | Gallagher | H02M 3/156 323/275 |
| 6,791,283 | B2 * | 9/2004 | Bowman | H05B 33/0815 315/291 |
| 7,425,819 | B2 * | 9/2008 | Isobe | H02M 3/156 323/222 |
| 8,903,263 | B2 * | 12/2014 | Matsumoto | G03G 15/5004 323/282 |
| 2010/0315044 | A1 | 12/2010 | Sunderlin | |
| 2012/0206107 | A1 * | 8/2012 | Ono | H02J 7/0029 320/136 |
| 2015/0061543 | A1 | 3/2015 | Pierce et al. | |

* cited by examiner

*Primary Examiner* — Nguyen Tran

(57) ABSTRACT

A battery discharge circuit has a switching circuit and a controller. The switching circuit is coupled between a battery and a load. The controller is configured to generate a control signal to control the switching circuit. When the battery voltage drops below a first reference voltage, the controller adjusts the control signal to regulate the battery voltage to be equal to the first reference voltage.

12 Claims, 6 Drawing Sheets

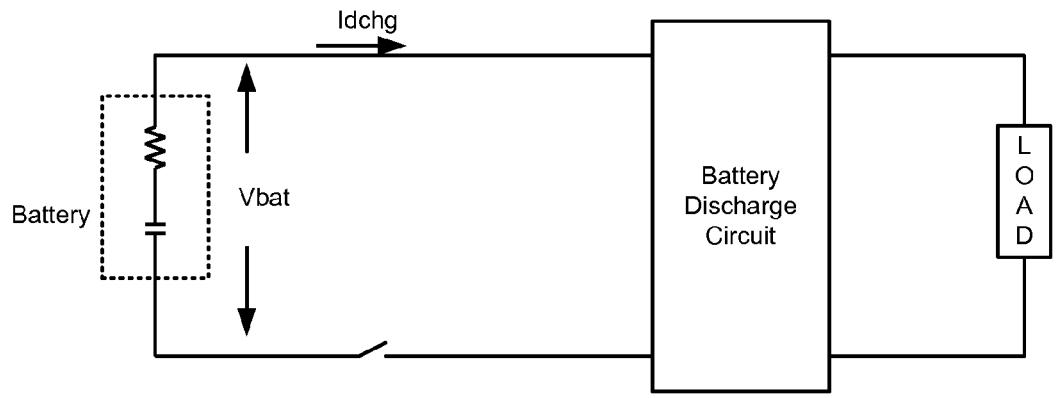
FIG. 1 *(Prior Art)*
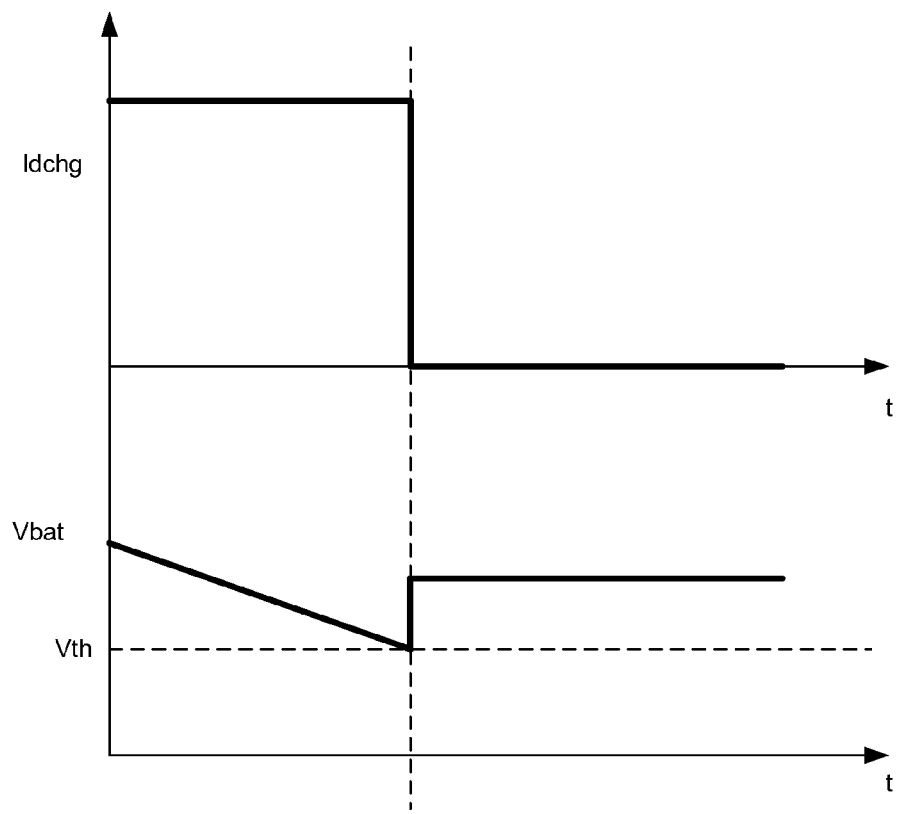
FIG. 2 *(Prior Art)*

BATTERY DISCHARGE CIRCUIT AND DISCHARGE METHOD WITH OVER DISCHARGE PROTECTION

CROSS-REFERENCE TO RELATED APPLICATION(S)

This application claims the benefit of CN application 201310472688.9 filed on Oct. 11, 2013, and incorporated herein by reference.

TECHNICAL FIELD

The present invention generally relates to electronic circuits, and more particularly but not exclusively to battery discharge circuits and discharge methods.

BACKGROUND

In practical battery management applications, the battery is disconnected from the power path when the battery voltage drops below a threshold, so as to prevent the battery from being drained too much. However, this over discharge protection method will cause some issues under the condition of large discharge current.

As shown in FIG. 1, the battery is illustrated as a block having a capacitor and an internal resistor, the battery discharge circuit is coupled between the battery and a load and used to provide the energy stored in the battery to the load. FIG. 2 illustrates waveforms of the battery discharge circuit shown in FIG. 1 under large discharge current. As shown in FIG. 2, when the discharge current Idchg is large, the voltage across the internal resistor is also large. The battery voltage Vbat is quickly reduced to reach the threshold voltage Vth and the over discharge protection is triggered. The battery and the battery discharge circuit are disconnected, the voltage across the internal resistor as well as the discharge current Idchg is changed into zero. The battery voltage Vbat increases because of the battery internal resistor effect and relaxation effect. This means, there is still some battery capacity remained and not used.

SUMMARY

Embodiments of the present invention are directed to a battery discharge circuit comprising a switching circuit and a controller configured to generate a control signal to control the switching circuit. The switching circuit is coupled between a battery and a load, and is configured to receive the battery voltage and provide an output signal to the load. When the battery voltage drops below a first reference voltage, the controller adjusts the control signal to regulate the battery voltage to be equal to the first reference voltage.

Embodiments of the present invention are also directed to a controller used in a battery discharge circuit, wherein the battery discharge circuit has a switching circuit coupled between a battery and a load, and wherein the switching circuit is configured to receive the battery voltage and provide an output signal to the load. The controller comprises: a first error amplifying circuit configured to receive the battery voltage and a first reference voltage, wherein the first error amplifying circuit generates a first compensation signal based on the difference between the battery voltage and the first reference voltage; and a PWM circuit coupled to the first error amplifying circuit to receive the first compensation signal, wherein based on the first compensation signal, the PWM circuit generates a control signal to control the switching circuit when the battery voltage drops below the first reference voltage.

Embodiments of the present invention are further directed to a battery discharge method comprising: converting a battery voltage into an output signal through a switching circuit coupled between a battery and a load; determining whether the battery voltage drops below a first reference voltage; and if the battery voltage drops below the first reference voltage, adjusting a control signal controlling the switching circuit to regulate the battery voltage to be equal to the first reference voltage.

In the embodiments of the present invention, when the battery voltage drops below a first reference voltage, it is regulated to not drop further through adjusting the control signal of the switching circuit. The discharge current decreases during the regulation, the battery internal resistor effect is weakened and the battery voltage approaches the open circuit voltage. As a result, the battery is protected from over discharge and the battery capacity can be drained as much as possible.

BRIEF DESCRIPTION OF THE DRAWINGS

The present invention can be further understood with reference to the following detailed description and the appended drawings, wherein like elements are provided with like reference numerals.

FIG. 1 illustrates a prior battery discharge circuit.

FIG. 2 illustrates waveforms of the battery discharge circuit shown in FIG. 1 under large discharge current.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 3:
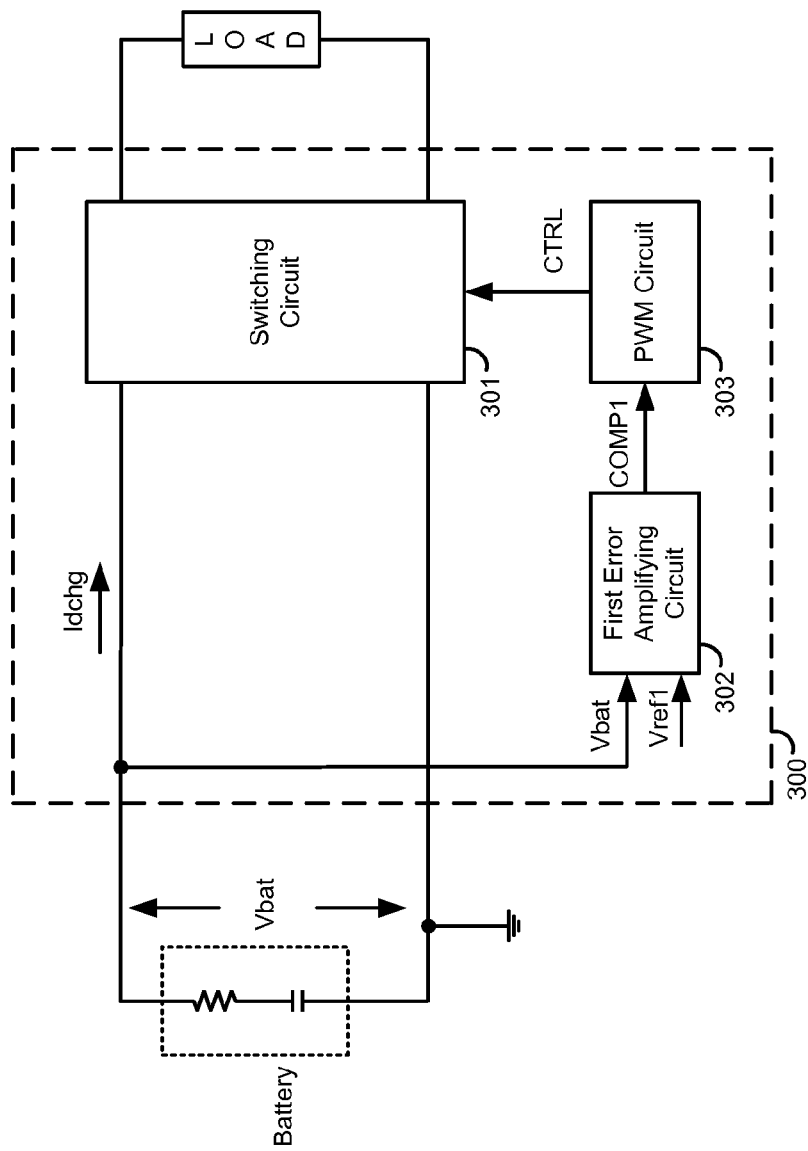
FIG. 3 illustrates a block diagram of a battery discharge circuit 300 in accordance with an embodiment of the present invention.

FIG. 3 illustrates a block diagram of a battery discharge circuit 300 in accordance with an embodiment of the present invention. The battery discharge circuit 300 comprises a switching circuit 301 and a controller. The switching circuit 301 is coupled between a battery and a load. It has at least one switch and is configured to convert the energy stored in the battery to the load. The switching circuit 301 may be configured in any DC/DC or DC/AC topologies, such as Boost circuit, Buck circuit and so on.

The controller comprises a first error amplifying circuit 302 and a PWM (pulse width modulation) circuit 303. The first error amplifying circuit 302 has a first input terminal, a second input terminal and an output terminal, wherein the first input terminal is coupled to the battery to receive the battery voltage Vbat, the second input terminal is configured to receive a first reference voltage Vref1. Based on the difference between the battery voltage Vbat and the first reference voltage Vref1, the first error amplifying circuit 302 generates a first compensation signal COMP1 at the output terminal. The PWM circuit 303 is coupled to the output terminal the first error amplifying circuit 302 to receive the first compensation signal COMP1. When the battery voltage Vbat drops below the first reference voltage Vref1, the PWM circuit 303 generates a control signal CTRL to control the switching circuit 301 based on the first compensation signal COMP1.

In an embodiment, to prevent the battery from over discharge, the switching circuit 301 is disconnected from the battery when the battery voltage Vbat drops below a threshold voltage Vth lower than the first reference voltage Vref1.

Figure 4:
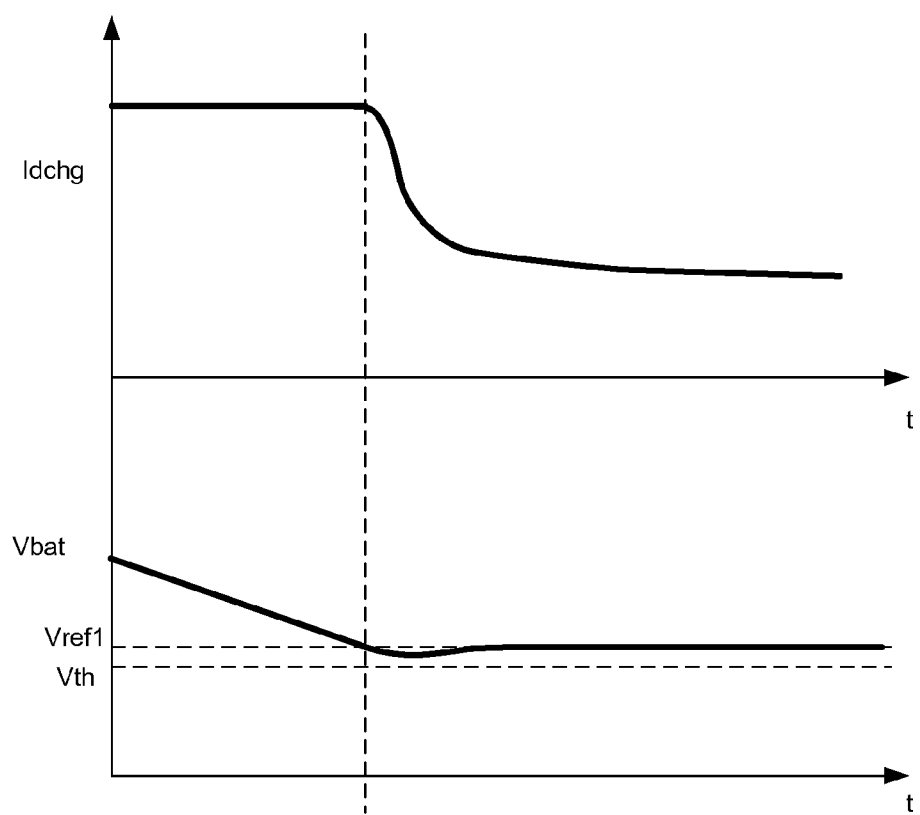
FIG. 4 illustrates waveforms of the battery discharge circuit 300 shown in FIG. 3 in accordance with an embodiment of the present invention.

FIG. 4 illustrates waveforms of the battery discharge circuit 300 shown in FIG. 3 in accordance with an embodiment of the present invention. As shown in FIG. 4, the battery voltage Vbat keeps decreasing because of the discharge current Idchg. When the battery voltage drops below the first reference voltage Vref1, the first error amplifying circuit 302 adjusts the control signal CTRL through the PWM circuit 303, so as to regulate the battery voltage Vbat to be equal to the first reference voltage Vref1. Thanks to the control signal CTRL, the discharge current Idchg gradually decreases. The energy stored in the battery is continuously provided to the load, the battery capacity is drained as much as possible and the battery operating life is extended. Furthermore, when the discharge current Idchg decreases, the battery internal resistor effect is weakened and the battery voltage Vbat approaches the open circuit voltage. The battery over discharge can be effectively avoided because of the regulation of the battery voltage Vbat.

Figure 5:
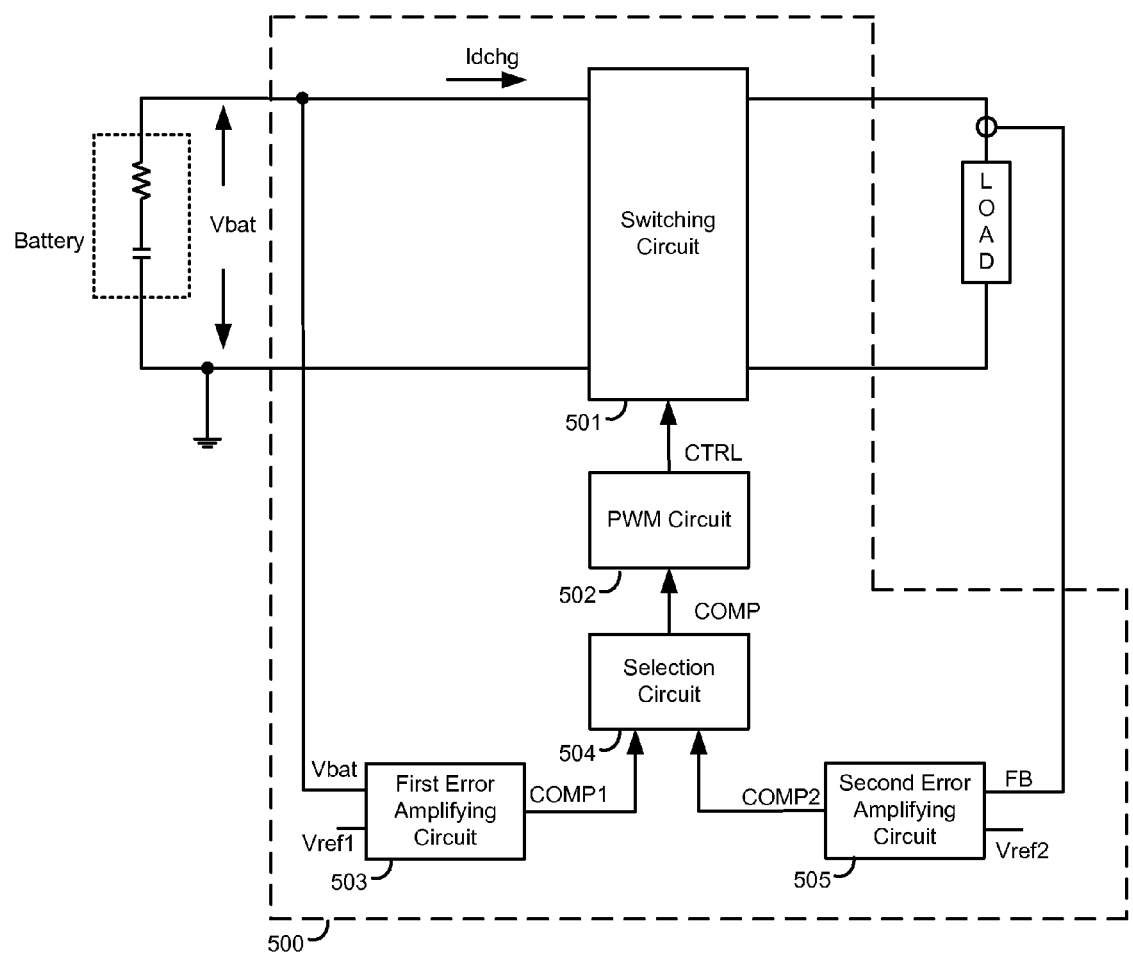
FIG. 5 illustrates a block diagram of a battery discharge circuit 500 in accordance with an embodiment of the present invention.

FIG. 5 illustrates a block diagram of a battery discharge circuit 500 in accordance with an embodiment of the present invention. Compared with the circuit shown in FIG. 3, the controller in the battery discharge circuit 500 further comprises a selection circuit 504 and a second error amplifying circuit 505. A feedback signal FB indicative of the output signal (e.g. output current, output voltage or output power) of the switching circuit 501 is provided to the second error amplifying circuit 505. The second error amplifying circuit 505 has a first input terminal, a second input terminal and an output terminal, wherein the first input terminal is configured to receive a second reference voltage Vref2, the second input terminal is configured to receive the feedback signal FB. Based on the difference between the second reference voltage Vref2 and the feedback signal FB, the second error amplifying circuit 505 generates a second compensation signal COMP2 at the output terminal. The selection circuit 504 has a first input terminal, a second input terminal and an output terminal, wherein the first input terminal is coupled to the output terminal of the first error amplifying circuit 503, the second input terminal is coupled to the output terminal of the second error amplifying circuit 505, the output terminal is coupled to the PWM circuit 502. Based on the battery voltage Vbat, the selection circuit 504 provides the first compensation signal COMP1 or the second compensation signal COMP2 to the output terminal as a compensation signal COMP. The PWM circuit 502 generates the control signal CTRL to control the switching circuit 501 based on the compensation signal COMP.

When the battery voltage Vbat is higher than the first reference voltage Vref1, the second compensation signal COMP2 is provided to the PWM circuit 502. The PWM circuit 502 generates the control signal CTRL based on the second compensation signal COMP2 to regulated the output signal to be equal to a desired value. When the battery voltage Vbat is lower than the first reference voltage Vref1, the first compensation signal COMP1 is provided to the PWM circuit 502. The PWM circuit 502 generates the control signal CTRL based on the first compensation signal COMP1 to regulated the battery voltage Vbat to be equal to the first reference voltage Vref1.

Figure 6:
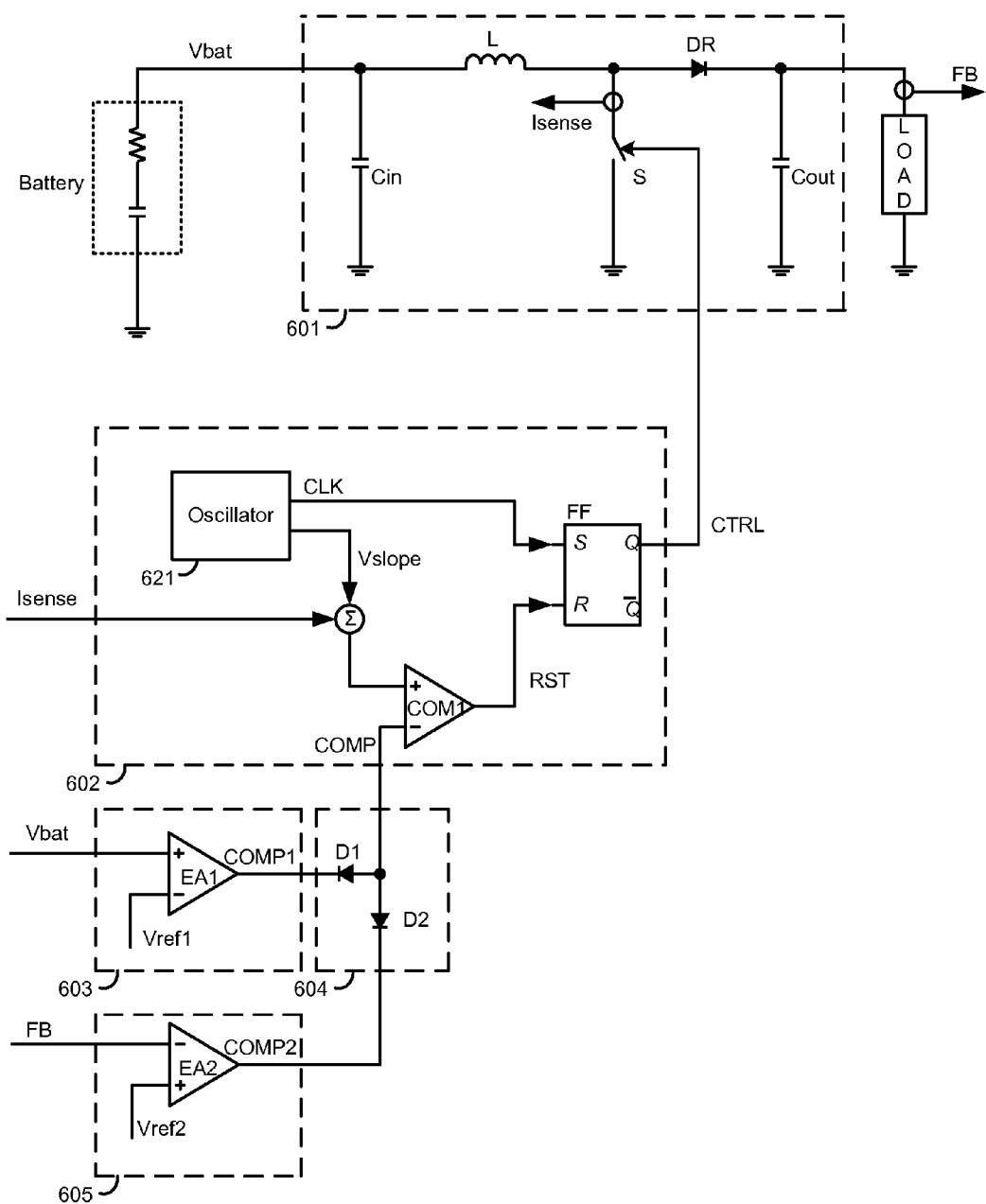
FIG. 6 schematically illustrates a battery discharge circuit in accordance with an embodiment of the present invention.

FIG. 6 schematically illustrates a battery discharge circuit in accordance with an embodiment of the present invention, wherein the switching circuit 601 is configured in a Buck circuit comprising an input capacitor Cin, an output capacitor Cout, an inductor L, a switch S and a diode DR.

The PWM circuit 602 comprises an oscillator 621, a comparator COM1 and a flip-flop FF. The oscillator 621 is configured to generate a clock signal CLK and a ramp signal Vslope. The comparator COM1 has a non-inverting input terminal, an inverting input terminal and an output terminal, wherein the non-inverting input terminal is configured to receive a sum of the ramp signal Vslope and a current sensing signal Isense indicative of the current flowing through the switch S, the inverting input terminal is coupled to the selection circuit 604 to receive the compensation signal COMP. The comparator COM1 compares the sum of the ramp signal Vslope and the current sensing signal Isense with the compensation signal COMP, and generates a reset signal RST at the output terminal. The flip-flop FF has a set terminal, a reset terminal and an output terminal, wherein the set terminal is coupled to the oscillator 621 to receive the clock signal CLK, the reset terminal is coupled to the output terminal of the comparator COM1 to receive the reset signal RST. Based on the clock signal CLK and the reset signal RST, the flip-flop FF generates the control signal CTRL at the output terminal.

The first error amplifying circuit 603 and second error amplifying circuit 605 respectively comprises error amplifiers EA1 and EA2, connected as shown in FIG. 6. The selection circuit 604 comprises diodes D1 and D2. The cathode of the diode D1 is coupled to the first error amplifying circuit 603 to receive the first compensation signal COMP1, the cathode of the diode D2 is coupled to the second error amplifying circuit 605 to receive the second compensation signal COMP2. The anodes of the diodes D1 and D2 are coupled together to provide the compensation signal COMP to the PWM circuit 602.

When the battery voltage Vbat is higher than the first reference voltage Vref1, the first compensation signal COMP1 is larger than the second compensation signal COMP2. The diode D1 is turned off and the diode D2 is turned on, the second compensation signal COMP2 is provided to the PWM circuit 602. The PWM circuit 602 generates the control signal CTRL based on the second compensation signal COMP2 to regulate the output signal of the switching circuit to be equal to the desired value. When the battery voltage Vbat is lower than the first reference voltage Vref1, the first compensation signal COMP1 is smaller than the second compensation signal COMP2. The diode D1 is turned on and the diode D2 is turned off, the first compensation signal COMP1 is provided to the PWM circuit 602. The PWM circuit 602 generates the control signal CTRL based on the first compensation signal COMP1 to regulate the battery voltage Vbat to be equal to the first reference voltage Vref1.

Figure 7:
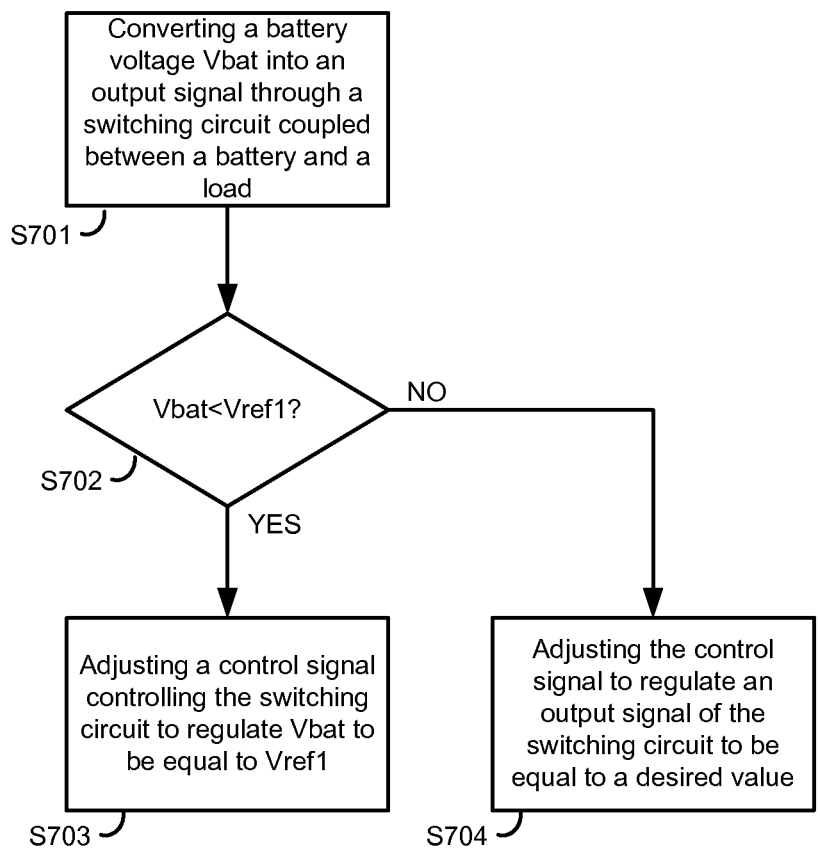
FIG. 7 illustrates a working flowchart of a battery discharge method in accordance with an embodiment of the present invention.

FIG. 7 illustrates a working flowchart of a battery discharge method in accordance with an embodiment of the present invention. It comprises steps S701~S704.

At step S701, a battery voltage Vbat is converted into an output signal through a switching circuit coupled between a battery and a load.

At step S702, whether the battery voltage Vbat drops below a first reference voltage Vref1 is determined. If the battery voltage Vbat drops below the first reference voltage Vref1, proceeds to step S703, else, proceeds to step S704.

At step S703, a control signal controlling the switching circuit is adjusted to regulate the battery voltage Vbat to be equal to the first reference voltage Vref1.

At step S704, the control signal is adjusted to regulate an output signal of the switching circuit to be equal to a desired value.

In an embodiment, the battery discharge method further comprises determining whether the battery voltage Vbat drops below a threshold voltage Vth lower than the first reference voltage Vref1, and disconnecting the switching circuit from the battery or shutting down the switching circuit if the battery voltage Vbat drops below the threshold voltage Vth.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:

1. A battery discharge circuit comprising:
a switching circuit coupled between a battery and a load, wherein the switching circuit is configured to receive a battery voltage and provide an output signal to the load; and
a controller configured to generate a control signal to control the switching circuit, wherein when the battery voltage drops below a first reference voltage, the controller adjusts the control signal to reduce a discharge current drawn by the switching circuit from the battery, so as to regulate the battery voltage to be equal to the first reference voltage; wherein
the controller comprises:
a first error amplifying circuit configured to receive the battery voltage and the first reference voltage, wherein the first error amplifying circuit generates a first compensation signal based on the difference between the battery voltage and the first reference voltage;

a second error amplifying circuit configured to receive a second reference voltage and a feedback signal indicative of the output signal, wherein the second error amplifying circuit generates a second compensation signal based on the difference between the second reference voltage and the feedback signal; and
a selection circuit coupled to the first error amplifying circuit and the second error amplifying circuit, wherein the selection circuit selects the first compensation signal as a compensation signal when the battery voltage is lower than the first reference voltage, and selects the second compensation signal as the compensation signal when the battery voltage is higher than the first reference voltage; and
a PWM circuit coupled to the selection circuit to receive the compensation signal, wherein based on the compensation signal, the PWM circuit generates the control signal to control the switching circuit.

2. The battery discharge circuit of claim 1, wherein the output signal of the switching circuit comprises the output current, output voltage or output power of the switching circuit.

3. The battery discharge circuit of claim 1, wherein the PWM circuit comprises:
an oscillator configured to generate a clock signal and a ramp signal;
a comparator having a first input terminal, a second input terminal and an output terminal, wherein the first input terminal is configured to receive a sum of the ramp signal and a current sensing signal indicative of the current flowing through a switch in the switching circuit, the second input terminal is coupled to the selection circuit to receive the compensation signal, and wherein the comparator compares the sum of the ramp signal and the current sensing signal with the compensation signal, and generates a reset signal at the output terminal; and
a flip-flop having a first input terminal, a second input terminal and an output terminal, wherein the firs input terminal is coupled to the oscillator to receive the clock signal, the second input terminal is coupled to the output terminal of the comparator to receive the reset signal, and wherein based on the clock signal and the reset signal, the flip-flop generates the control signal at the output terminal.

4. The battery discharge circuit of claim 1, wherein the selection circuit comprises a first diode and a second diode with each of the diodes having an anode and a cathode, wherein the cathode of the first diode is coupled to the first error amplifying circuit to receive the first compensation signal, the cathode of the second diode is coupled to the second error amplifying circuit to receive the second compensation signal, the anodes of the first diode and the second diode are coupled together to provide the compensation signal to the PWM circuit.

5. A controller used in a battery discharge circuit, wherein the battery discharge circuit has a switching circuit coupled between a battery and a load, and wherein the switching circuit is configured to receive a battery voltage and provide an output signal to the load, the controller comprises:
a first error amplifying circuit configured to receive the battery voltage and a first reference voltage, wherein the first error amplifying circuit generates a first compensation signal based on the difference between the battery voltage and the first reference voltage;

a second error amplifying circuit configured to receive a second reference voltage and a feedback signal indicative of the output signal, wherein the second error amplifying circuit generates a second compensation signal based on the difference between the second reference voltage and the feedback signal;

a selection circuit coupled to the first error amplifying circuit and the second error amplifying circuit, wherein the selection circuit selects the first compensation signal as a compensation signal when the battery voltage is lower than the first reference voltage, and selects the second compensation signal as the compensation signal when the battery voltage is higher than the first reference voltage; and a PWM circuit coupled to the selection circuit to receive the compensation signal, wherein based on the compensation signal, the PWM circuit generates a control signal to control the switching circuit, so as to reduce a discharge current drawn by the switching circuit from the battery and regulate the battery voltage to be equal to the first reference voltage when the battery voltage drops below the first reference voltage.

6. The controller of claim 5, wherein the output signal of the switching circuit comprises the output current, output voltage or output power of the switching circuit.

7. The controller of claim 5, wherein the PWM circuit comprises:

an oscillator configured to generate a clock signal and a ramp signal;

a comparator having a first input terminal, a second input terminal and an output terminal, wherein the first input terminal is configured to receive a sum of the ramp signal and a current sensing signal indicative of the current flowing through a switch in the switching circuit, the second input terminal is coupled to the selection circuit to receive the compensation signal, and wherein the comparator compares the sum of the ramp signal and the current sensing signal with the compensation signal, and generates a reset signal at the output terminal; and a flip-flop having a first input terminal, a second input terminal and an output terminal, wherein the firs input terminal is coupled to the oscillator to receive the clock signal, the second input terminal is coupled to the output terminal of the comparator to receive the reset signal, and wherein based on the clock signal and the reset signal, the flip-flop generates the control signal at the output terminal.

8. The controller of claim 5, wherein the selection circuit comprises a first diode and a second diode with each of the diodes having an anode and a cathode, wherein the cathode of the first diode is coupled to the first error amplifying circuit to receive the first compensation signal, the cathode of the second diode is coupled to the second error amplifying circuit to receive the second compensation signal, the anodes of the first diode and the second diode are coupled together to provide the compensation signal to the PWM circuit.

9. A battery discharge method, comprising:

converting a battery voltage into an output signal through a switching circuit coupled between a battery and a load;

generating a first compensation signal based on the difference between the battery voltage and a first reference voltage;

generating a feedback signal indicative of the output signal of the switching circuit;

generating a second compensation signal based on the difference between a second reference voltage and the feedback signal;

determining whether the battery voltage drops below the first reference voltage;

selecting the first compensation signal as a compensation signal if the battery voltage is lower than the first reference voltage;

selecting the second compensation signal as the compensation signal if the battery voltage is higher than the first reference voltage; and generating a control signal to control the switching circuit based on the compensation signal, so as to reduce a discharge current drawn by the switching circuit from the battery and regulate the battery voltage to be equal to the first reference voltage when the battery voltage drops below the first reference voltage.

10. The battery discharge method of claim 9, further comprising:

if the battery voltage is higher than the first reference voltage, adjusting the control signal to regulate the output signal of the switching circuit to be equal to a desired value.

11. The battery discharge method of claim 9, wherein the output signal of the switching circuit comprises the output current, output voltage or output power of the switching circuit.

12. The battery discharge method of claim 11, wherein the step of generating the control signal based on the compensation signal comprises:

generating a clock signal and a ramp signal;

sensing the current flowing through a switch in the switching circuit and generating a current sensing signal;

comparing the sum of the ramp signal and the current sensing signal with the compensation signal, and generating a reset signal; and generating the control signal based on the clock signal and the reset signal.

\* \* \* \* \*